(12) United States Patent
Lebas et al.

(10) Patent No.: US 10,486,519 B2
(45) Date of Patent: Nov. 26, 2019

(54) TORQUE TRANSMISSION DEVICE, IN PARTICULAR FOR A MOTOR VEHICLE

(71) Applicant: VALEO EMBRAYAGES, Amiens (FR)

(72) Inventors: Gilles Lebas, Villers Bretonneux (FR); Emmanuel Commeine, Courcelles sous Moyencourt (FR)

(73) Assignee: Valeo Embrayages, Amiens (FR)

( * ) Notice: Subject to any disclaimer, the term of this patent is extended or adjusted under 35 U.S.C. 154(b) by 247 days.

(21) Appl. No.: 15/609,467

(22) Filed: May 31, 2017

(65) Prior Publication Data
US 2017/0355257 A1    Dec. 14, 2017

(30) Foreign Application Priority Data

Jun. 9, 2016   (FR) ..................................... 16 55324

(51) Int. Cl.
| | | |
|---|---|---|
| *F16D 47/00* | (2006.01) | |
| *B60K 6/387* | (2007.10) | |
| *B60K 6/48* | (2007.10) | |
| *F16D 13/46* | (2006.01) | |
| *F16D 13/58* | (2006.01) | |
| *B60K 6/40* | (2007.10) | |

(Continued)

(52) U.S. Cl.
CPC ................ *B60K 6/387* (2013.01); *B60K 6/40* (2013.01); *B60K 6/48* (2013.01); *F16D 11/10* (2013.01); *F16D 13/46* (2013.01); *F16D 13/56* (2013.01); *F16D 13/583* (2013.01); *F16D 25/083* (2013.01); *F16D 25/087* (2013.01); *F16D 25/10* (2013.01); *B60K 2006/4825* (2013.01); *B60Y 2200/92* (2013.01); *B60Y 2400/4244* (2013.01); *F16D 47/00* (2013.01); *H02K 7/108* (2013.01); *H02K 7/116* (2013.01); *Y02T 10/6252* (2013.01); *Y10S 903/914* (2013.01)

(58) Field of Classification Search
CPC . B60K 6/387; B60K 6/48; B60K 6/40; B60K 2006/4825; F16D 11/10; F16D 13/46; F16D 13/583; F16D 25/087; F16D 25/083; F16D 13/56; F16D 47/00; H02K 7/108; H02K 7/116; B60Y 2400/4244; B60Y 2200/92
See application file for complete search history.

(56) References Cited

U.S. PATENT DOCUMENTS

| | | | |
|---|---|---|---|
| 6,561,336 B1 * | 5/2003 | Huart | ...................... F02B 63/04 192/70.252 |
| 8,746,426 B2 | 6/2014 | Petzold et al. | |

(Continued)

FOREIGN PATENT DOCUMENTS

| | | |
|---|---|---|
| DE | 4201234 A1 | 7/1993 |
| DE | 102007050235 A1 | 4/2009 |

(Continued)

*Primary Examiner* — David J Hlavka
(74) *Attorney, Agent, or Firm* — Berenato & White, LLC

(57) ABSTRACT

The invention relates to a torque transmission device (1), having torque input means (2, 24) intended to be rotationally coupled to a crankshaft of an internal combustion engine (7), and torque output means (8) intended to be rotationally coupled to an input shaft (10) of a gearbox (36) and to a rotor (34) of an electric machine, the torque input means (2, 24) being capable of pivoting with respect to the torque output means (8) around an axis (X).

19 Claims, 5 Drawing Sheets

(51) Int. Cl.
- *F16D 11/10* (2006.01)
- *F16D 13/56* (2006.01)
- *F16D 25/08* (2006.01)
- *F16D 25/10* (2006.01)
- *H02K 7/108* (2006.01)
- *H02K 7/116* (2006.01)

(56) References Cited

U.S. PATENT DOCUMENTS

| | | | |
|---|---|---|---|
| 2009/0105040 A1* | 4/2009 | Sanji | B60K 6/40 477/5 |
| 2012/0062077 A1* | 3/2012 | Isogai | B60K 6/48 310/68 B |
| 2012/0083386 A1* | 4/2012 | Vogt | B60K 6/48 477/5 |
| 2014/0077641 A1* | 3/2014 | Ratte | H02K 7/108 310/78 |
| 2015/0122606 A1* | 5/2015 | Vogel | B60L 50/16 192/20 |

FOREIGN PATENT DOCUMENTS

| | | |
|---|---|---|
| DE | 102009047766 A1 | 6/2011 |
| DE | 102013214325 A1 | 1/2015 |
| DE | 102015211436 A1 | 1/2016 |
| FR | 2830589 A1 | 4/2003 |
| FR | 2845139 A1 | 4/2004 |
| WO | WO2015075365 A2 | 5/2015 |

\* cited by examiner

TORQUE TRANSMISSION DEVICE, IN PARTICULAR FOR A MOTOR VEHICLE

CROSS-REFERENCE TO RELATED APPLICATIONS AND CLAIM TO PRIORITY

This application is related to Patent Application No. 1655324 filed Jun. 9, 2016 in France, the disclosure of which is incorporated herein by reference and to which priority is claimed.

FIELD OF THE INVENTION

The invention relates to a torque transmission device, in particular for a motor vehicle, and to a hybrid drive system equipped with such a device.

BACKGROUND OF THE INVENTION

A transmission device for a hybrid motor vehicle, comprising two clutches and an electric machine disposed between the internal combustion engine of the vehicle and its gearbox, is known. Such a device is described, for example, in the document FR 2 830 589. Each of the clutches has a friction disc, a release bearing, and a pressure plate mounted axially movably with respect to said reaction plate between an engaged position in which the friction disc is clamped between said pressure and reaction plates, and a disengaged position. The two clutches are disposed on either side of the electric machine. The pressure plate of a first clutch, disposed on the engine side, is configured to be associated with the crankshaft of the internal combustion engine. The friction disc of the first clutch is mounted rotationally integrally with an intermediate shaft that is fastened to a support hub of the rotor of the electric machine. The pressure plate and the reaction plate of the second clutch, which is disposed on the gearbox side, are mounted rotationally integrally with said support hub of the rotor, and the friction disc of said second clutch is intended to interact with an input shaft of a gearbox.

The clutch on the engine side thus allows the crankshaft of the internal combustion engine to be rotationally coupled to the rotor of the electric machine, and the clutch on the gearbox side allows the rotor to be coupled to the input shaft of the gearbox. The internal combustion engine can thus be shut off at each stop, and restarted thanks to the electric machine. The electric machine can also constitute an electric brake, or can provide additional energy to the combustion engine to assist it or prevent it from stalling. When the engine is running, the electric machine can act as an alternator.

The electric machine can be a reversible rotating electric machine of the alternator/starter type or of the motor/generator type. In a starter-type operating mode the clutch situated on the engine side is engaged, and the electric machine allows the internal combustion engine to be started. In an alternator-type operating mode the electric machine allows a battery to be charged, and/or allows energy-consuming components or accessories to be powered when the internal combustion engine is running. It is furthermore configured to recover energy upon braking of the vehicle. The electric machine can be configured in particular to stop the internal combustion engine, for example, at a red light or in traffic jams, and then to restart it ("stop and go" function). In an embodiment, it is capable of furnishing additional power that makes it possible to prevent the engine from stalling ("boost" function). The electric machine can furthermore be capable of driving the vehicle at least for a short distance, the clutch situated on the engine side then being disengaged and the internal combustion engine shut off.

A device of this kind is relatively complex, costly, and bulky.

Patent Application DE 10 2015 211 436 discloses a transmission device for a hybrid vehicle, having in particular:
 a torque input flywheel rotationally integral with a crankshaft of an internal combustion engine;
 a torque output hub rotationally integral with an input shaft of a gearbox;
 a support rotationally integral with a rotor of an electric machine;
 control means capable of rotationally coupling the flywheel and the rotor via a first torque transfer path having elastic damping means and having no clutch means, said control means being capable of rotationally coupling the flywheel, the rotor, and the input shaft of the gearbox via a second torque transfer path having said elastic damping means and clutch means.

In the first operating mode the electric machine, and more particularly the rotor, can therefore rotationally drive the crankshaft so as to restart the electric motor if it has been stopped ("stop and go" function). Furthermore, in the second operating mode, if the clutch means are in an engaged position, the input shaft of the gearbox can be rotationally driven by the combustion engine.

In the first operating mode, the coupling between the flywheel and the rotor is implemented with the aid of toothed members. In the context of a rotational coupling of this kind, it is important to limit the torque transmitted from the rotor to the flywheel, given the risk of generating jolts and of prematurely degrading said toothed members and/or the combustion engine. Achieving torque control of this kind in a practical context is complex.

SUMMARY OF THE INVENTION

The object of the invention is in particular to provide a simple, effective, and economical solution to the problems mentioned above.

It proposes for that purpose a torque transmission device, in particular for a motor vehicle, having torque input means intended to be rotationally coupled to a crankshaft of an internal combustion engine, and torque output means intended to be rotationally coupled to an input shaft of a gearbox and to a rotor of an electric machine, the torque input means being capable of pivoting with respect to the torque output means around an axis, wherein it has control means selectively capable:
 in a first operating mode, of rotationally coupling the torque input means and the torque output means via a first torque transfer path having clutch means; or
 in a second operating mode, of rotationally coupling the torque input means and the torque output means via a second torque transfer path having no clutch means.

In the first operating mode the crankshaft can thus be rotationally driven by the rotor of the electric machine so that the combustion engine can be restarted if it has been stopped, for example by way of the clutch means which allow effective and simple control of the torque furnished to the crankshaft. Jolts are thus avoided, as well as any risk of degrading the combustion engine and the torque transmission device.

The control means can be capable, in a third operating mode, of rotationally decoupling the torque input means and torque output means.

The third operating mode thus corresponds to a so-called "neutral" mode. In an operating mode of this kind, the electric machine can be capable, for example, of driving the input shaft of the gearbox, and thus the vehicle, at least for a short distance.

The control means can have a release bearing comprising an actuation member movable between:
- a first axial position corresponding to the first operating mode, and
- a second axial position corresponding to the second operating mode, and
- optionally a third axial position corresponding to the third operating mode.

The third axial position can be situated axially between the first and second axial positions.

This ensures that the first and second modes cannot be implemented simultaneously.

The control means can have a transmission member comprising a first coupling zone intended to be rotationally coupled to the input shaft of the gearbox, and a second coupling zone, the transmission member being movable axially with the movable actuation member of the release bearing, the second coupling zone being coupled to the torque input means in the second axial position.

In this case the first coupling zone can be situated radially inside the transmission member, the second coupling zone being situated radially outside the transmission member.

The clutch means can have at least two plates and at least one friction disc situated axially between the two plates, the friction disc or the plates respectively being rotationally coupled to a hub belonging to the torque output means, the plates or the friction disc respectively being coupled to the torque input means, the plates being brought axially closer to one another in order to clamp the friction disc in the first operating mode.

In general, the clutch means can have an alternation of plates and friction discs.

The clutch means can have a diaphragm capable of tilting between an engaged position in which it tends to clamp the friction disc between the plates, and a disengaged position in which it releases the friction disc, the actuation member being capable of coming into abutment against the diaphragm so as to displace it into its engaged position in the first axial position of the actuation member.

The diaphragm can be annular, the actuation member coming into abutment against the radially inner periphery of the diaphragm in the first axial position, the diaphragm being installed tiltingly around a first radially outer abutment zone, the diaphragm coming into abutment against one of the plates, directly or indirectly, in a second abutment zone situated radially inside the first abutment zone.

The clutch means can also have an annular web interposed between the diaphragm and the control means, more precisely between the diaphragm and the transmission member. The annular web can be rotationally coupled to the diaphragm on the external periphery of the diaphragm. The radially internal periphery of the actuation member can come into abutment against the actuation member in order to exert a forward axial force that tends to bring the actuation member back into the position that it occupies in the third operating mode. The annular web allows mechanical rearward return of the control means. The web can ensure continuous contact between the diaphragm and the control means in order to prevent a speed differential between the two elements, which could generate wear or noise. The annular web can also be replaced by a plurality of fingers separate from one another.

A structure of this kind thus corresponds to a clutch of the normally-open type. The elasticity of the diaphragm is such that when it is not acted upon by the actuation member it is returned to its inactive position, i.e. its open or disengaged position.

The abutment points can of course be disposed differently in the case of a clutch of the normally-closed type. In this case, when the diaphragm is not acted upon by the actuation member (inactive position), the diaphragm is returned to its closed or engaged position.

The torque input means can have a cover that receives, at least in part, the clutch means, the actuation member, the transmission member, and/or the hub.

The torque input means can have a connecting member rotationally coupled to the cover, the second coupling zone of the transmission member meshing with the connecting member in the second axial position of the actuation member and of the transmission member.

The device can also exhibit one or more of the following characteristics:
- The first coupling zone is radially internal, and has splines or teeth capable of interacting with complementary splines of the input shaft of the gearbox.
- The second coupling zone is radially external, and has splines or teeth interacting with complementary splines or teeth of the connecting member in the second operating mode.
- The connecting member has radially external teeth or splines capable of interacting with splines of the cover so as to rotationally couple the connecting member and the cover.
- The connecting member is retained axially with respect to the cover between two snap rings or circlips installed in grooves of the cover.
- The first abutment zone of the diaphragm is formed by a collar coming into abutment against a snap ring or circlip installed in a groove of the cover. This snap ring can in particular be one of the two rings that axially retain the connecting member.
- The cover has a radial portion whose radially outer periphery is prolonged by a cylindrical portion.
- At least one of the plates of the clutch means is capable of coming into axial abutment, directly or indirectly, against the radial portion of the cover.
- At least one bearing, for example a thrust-type roller bearing, is installed axially between the actuation member and the transmission member.
- At least one bearing, for example a thrust-type roller bearing, is installed axially between the transmission member and the diaphragm.

The invention also relates to a hybrid drive system comprising:
- an internal combustion engine having a crankshaft capable of being rotationally driven around an axis;
- an electric machine having a stator and a rotor capable of being rotationally driven with respect to the stator around the axis;
- a gearbox having an input shaft;
- a torque transmission device of the kind recited above, the rotor, the input shaft of the gearbox, and the torque output means being rotationally coupled, the torque input means and the crankshaft being rotationally coupled.

BRIEF DESCRIPTION OF THE DRAWINGS

The invention will be better understood, and other details, characteristics, and advantages of the invention will emerge, upon reading the description below provided as a non-limiting example referring to the attached drawings, in which.

DETAILED DESCRIPTION OF THE PREFERRED EMBODIMENT(S)

Figure 1:
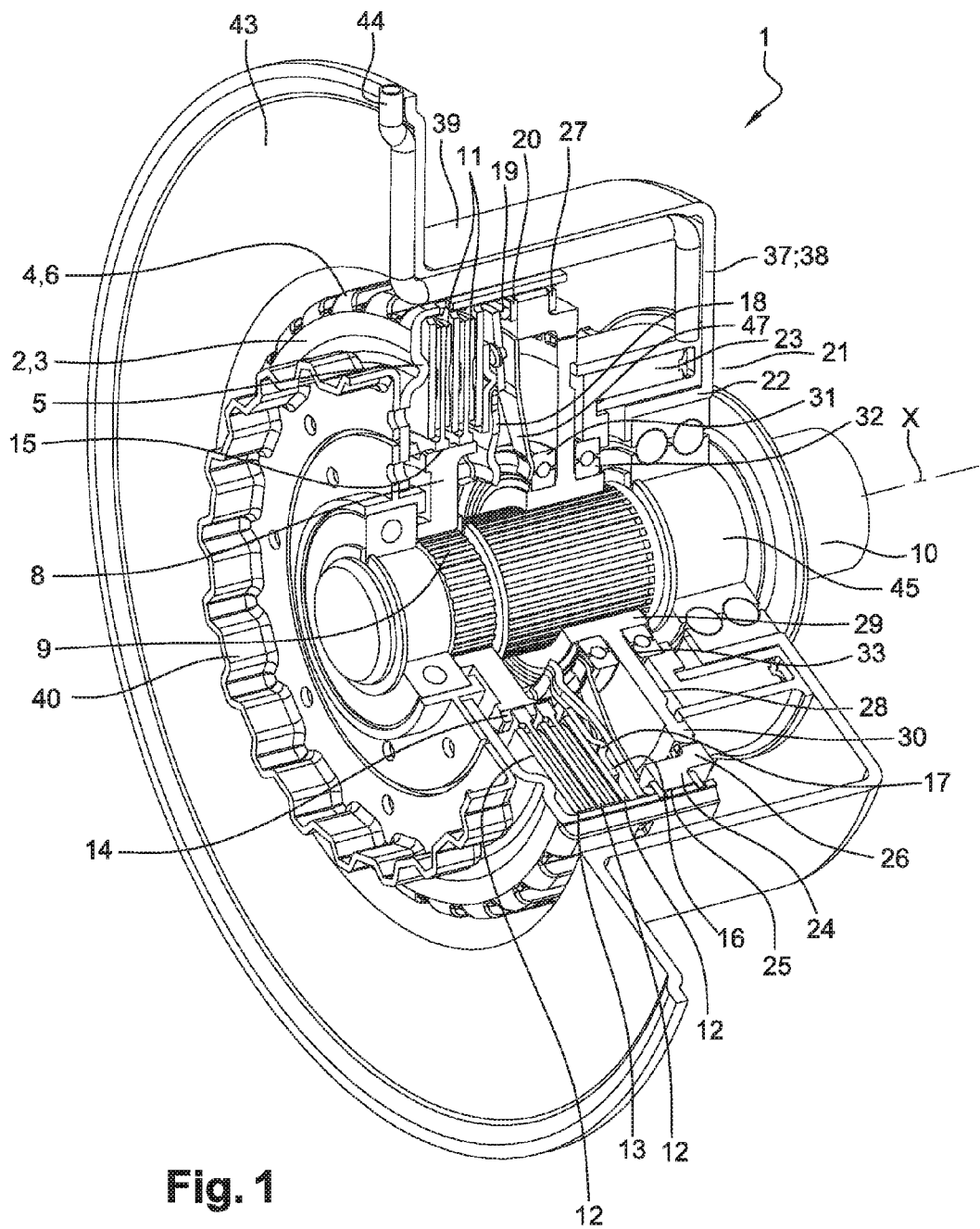
FIGS. 1 and 2 are partly cut-away perspective views of a torque transmission device according to an embodiment of the invention.
Figure 2:
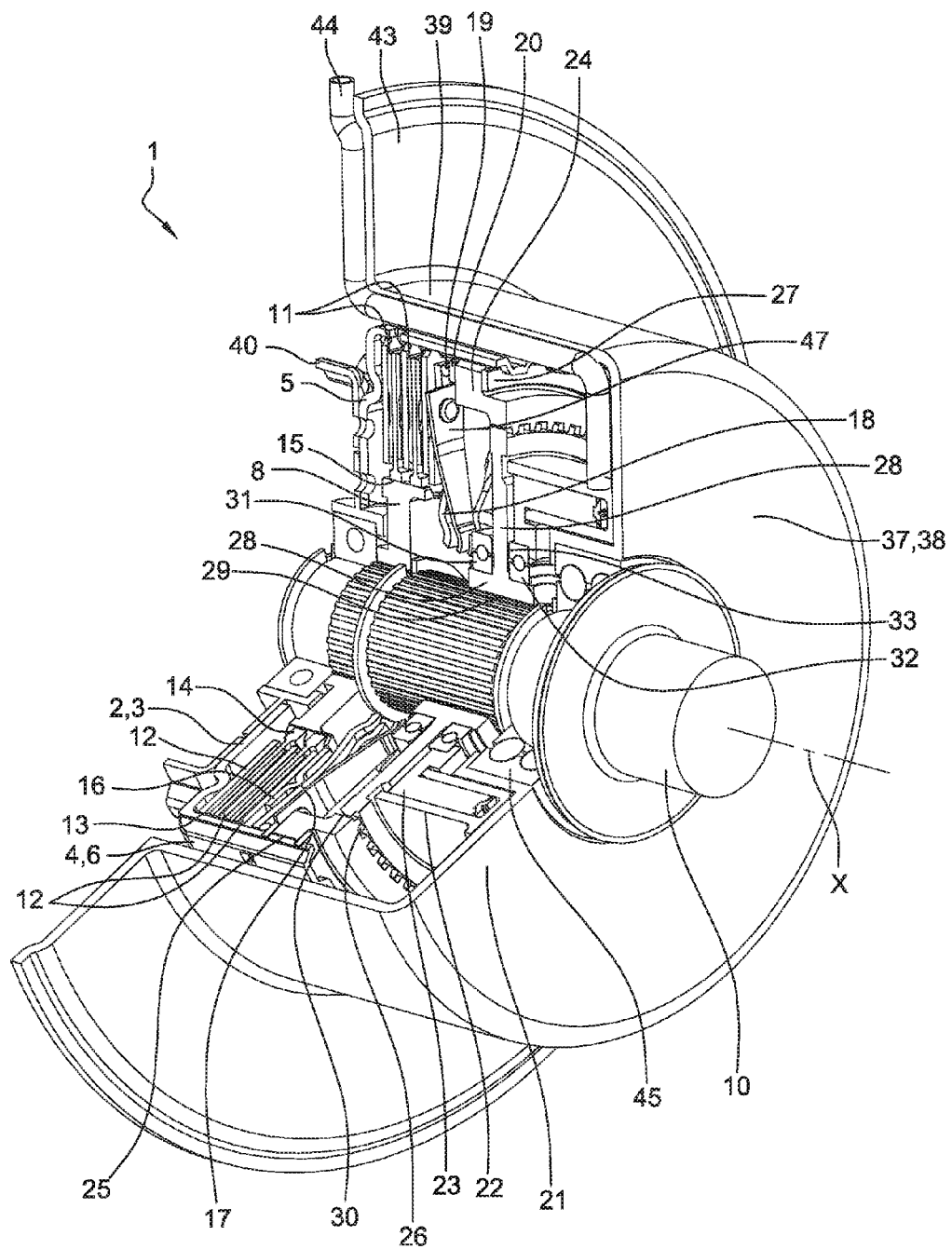

FIGS. 1 to 5 depict a torque transmission device 1, in particular for a motor vehicle, according to an embodiment of the invention.

Torque transmission device 1 has a cover 2 on axis X, having an annular radial portion 3 whose radially outer periphery is prolonged by a cylindrical portion 4 extending forward.

The terms "radial," "axial," and "circumferential" are defined with respect to axis X.

The front face of the radial portion has a protruding, annularly shaped abutment zone 5 that is rounded in section. Abutment zone 5 is constituted, for example, by deformation of the material of the cover, for example by stamping.

Cylindrical portion 4 has a succession of splines 6, extending axially and distributed over the entire circumference.

The radial portion is intended to be rotationally coupled to a crankshaft of an internal combustion engine 7 (FIG. 4) by means of a star-shaped connection part 40 situated axially behind cylindrical portion 4. Connection part 40 in particular can be rotationally coupled to a vibration damping device, for example a dual mass flywheel.

Cover 2 and the connecting part are carried axially by the input shaft of the gearbox, by means of a rolling bearing 46. Although this is not depicted, the cover and the connecting part could be carried by a torsional damper disposed between the internal combustion engine and the cover.

The torque transmission device 1 furthermore has a clutch having a central hub 8 whose radially inner periphery is splined and interacts with splines 9 of an input shaft 10 of a gearbox 36. The central hub 8 and the input shaft 10 of the gearbox 36 are thus non-rotatably coupled.

The clutch furthermore comprises friction discs 11 inserted between annular plates 12.

In the embodiment depicted, the clutch comprise three plates 12 and two friction discs 11, plates 12 and friction discs 11 being installed alternatingly. The clutch can also respectively comprise one friction disc or three friction discs, and two plates or four plates.

The outer peripheries of plates 12 have teeth 13 capable of meshing into splines 6 of cover 2, so as to rotationally couple plates 12 and cover 2 while allowing axial displacement of plates 11.

The inner peripheries of friction discs 11 have teeth 14 capable of meshing with splines 15 of the radially outer periphery of central hub 8, so as to rotationally couple friction discs 11 and central hub 8 while allowing axial displacement of friction discs 11 with respect to hub 8.

Rear plate 12 is capable of coming into abutment against radial portion 3 of cover 2, in particular against projecting annular zone 5 of cover 2.

An abutment member 16 is installed in front of front plate 12, abutment member 16 having an annular abutment portion 17 projecting forward.

The clutch furthermore has a diaphragm 18 whose outer periphery is capable of coming into abutment against a toroidal washer or clip 19 situated directly in front of diaphragm 18, the washer 19 in turn being in abutment against a snap ring or circlip 20 installed in front of the conical washer in a groove configured in cylindrical portion 4 of cover 2. Abutment washer 19 is thus axially immobilized with respect to cover 2.

The clutch can also have an annular web 47 rotationally coupled to diaphragm 18 on its external periphery by means of rivets. As a variant, fingers disposed around the axis, and separate from one another, are provided as a replacement for web 47.

Abutment zone 17 of member 16 is capable of abutting against diaphragm 18 in a zone situated radially inside abutment washer 19.

Torque transmission device 1 furthermore has controller having a release bearing 21. Said release bearing 21 has a portion 22 that is fixed with respect to an additional cover 37, and an actuation member 23 that is movable in the axial direction with respect to fixed portion 22. Actuation member 23 can be constituted by a nut or by a piston, for example, as is known per se.

Additional cover 37 can be provided, the additional cover 37 receiving cover 2 and release bearing 21. Additional cover 37 here has a front radial portion 38 that is annular and surrounds input shaft 10, the radially outer periphery of which is prolonged rearward by an axial portion 39 that ends at the rear in a rim 43 extending radially outward. Radial portion 38 also has an internal end interposed radially between fixed portion 22 and a rolling bearing 45. Fixed portion 22 and radial portion 38 are carried axially by input shaft 10 of the gearbox by means of that rolling bearing 45.

A supply tube 44 is also provided in order to supply fluid to release bearing 21. This supply tube 44 is fastened onto the additional cover 37 and opens onto the exterior thereof.

A connecting member 24 is installed inside cylindrical portion 4 of cover 2. The connecting member 24 has teeth 25 on its radially outer periphery and teeth 26 on its radially inner periphery. The radially outer periphery of the connecting member 24 is situated axially toward the rear with respect to the radially inner periphery. The teeth 25 of the radially outer periphery interact with splines 6 of the cylindrical portion 4 of the cover 2 so as to non-rotatably couple the connecting member 24 and the cover 2. The cover 2 and the connecting member 24 collectively form a torque input device 2, 24. The connecting member 24 is retained axially between two snap members or circlips 27 and 20 disposed respectively at the front and at the rear, installed in grooves of the cover 2.

An annular transmission member 28 is mounted around input shaft 10 of the gearbox. Transmission member 28 extends radially, and has teeth 29 on its radially inner periphery and teeth 30 on its radially outer periphery.

Teeth 29 of the radially inner periphery interact with splines 9 of input shaft 10 of the gearbox, and teeth 30 of the outer periphery can be capable of interacting with teeth 26 of the inner periphery of connecting member 24, depending on the axial position of transmission member 28.

Transmission member 28 is thus rotationally coupled to input shaft 10 of the gearbox while being capable of being displaced axially with respect thereto.

Transmission member 28 is installed axially between two bearings 31, 32 constituted here by thrust-type roller bearings, more particularly thrust-type ball bearings. A first bearing 31 is inserted axially between the radially inner periphery of diaphragm 18 and transmission member 28. A second bearing 32 is inserted axially between transmission member 28 and actuation member 23. A washer 33 can be inserted axially between each bearing 31, 32 and transmission member 28.

Transmission member 28 is thus displaced axially with control member 23 of release bearing 21.

Annular web 47 is interposed between diaphragm 18 and transmission member 28, more precisely between diaphragm 18 and bearing 31. Annular web 47 comes into abutment at its radially internal periphery against bearing 31, thus exerting an axial force forward onto transmission member 28.

Figure 3:
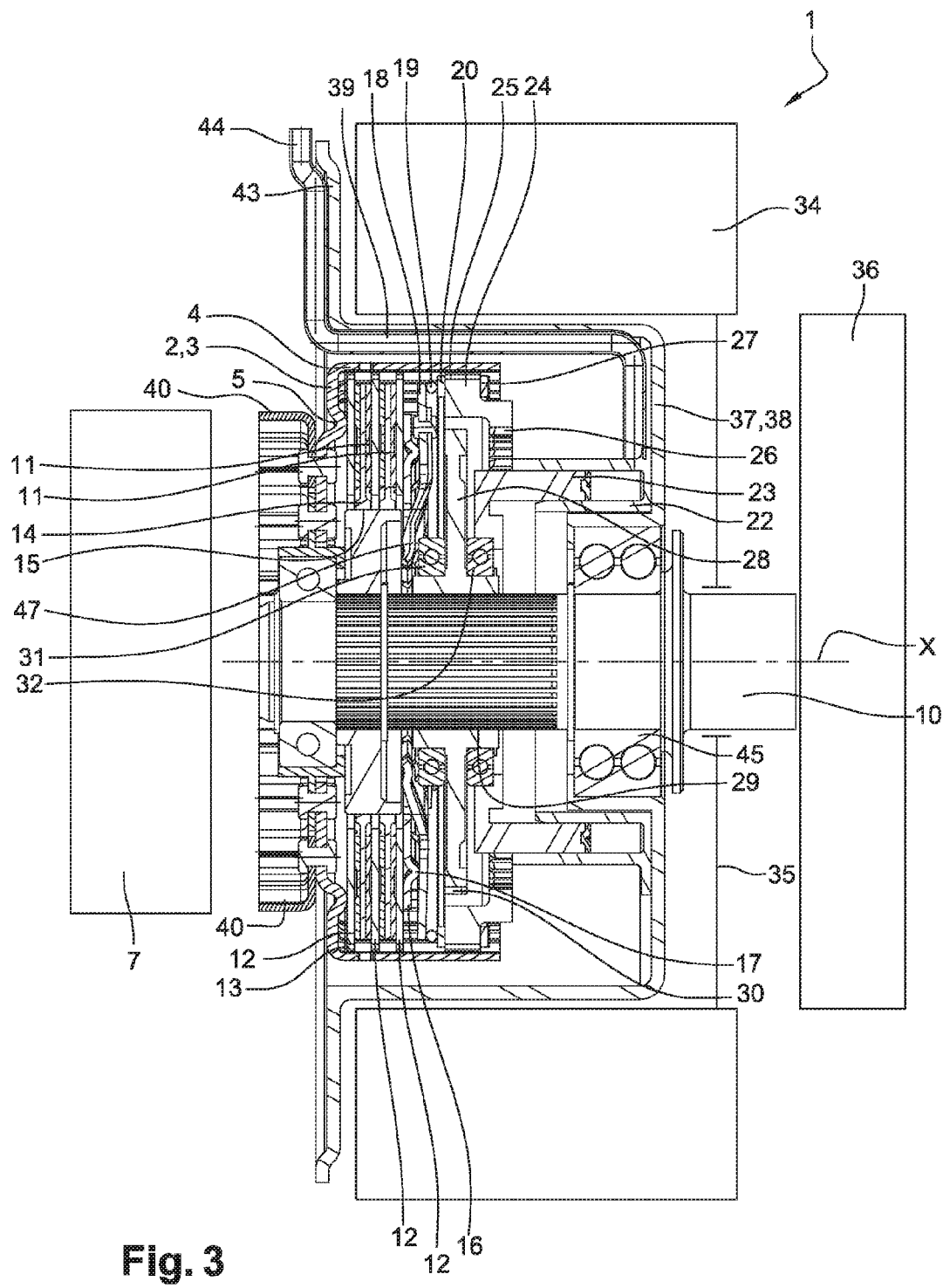
FIGS. 3, 4, and 5 are axial section views of the device of FIG. 1 with the control member and transmission member in different axial positions, the rotor, the combustion engine, and the gearbox having been schematically depicted in FIG. 3.

The cover 2 is intended to be non-rotatably coupled to the crankshaft of the internal combustion engine 7 of a motor vehicle, illustrated schematically in FIG. 3. A torsional damping device can also be disposed between the internal combustion engine 7 and the cover 2.

A rotor 34 of an electric machine is rotationally coupled, for example via a support 35, to input shaft 10 of gearbox 36. Such coupling can be provided by any means. As a variant, additional cover 37 can perform the rotor support function, in which case a support 35 specifically dedicated to rotor 34 is not necessary.

The electric machine is, for example, a reversible rotating electric machine of the alternator/starter type or of the motor/generator type.

Figure 4:
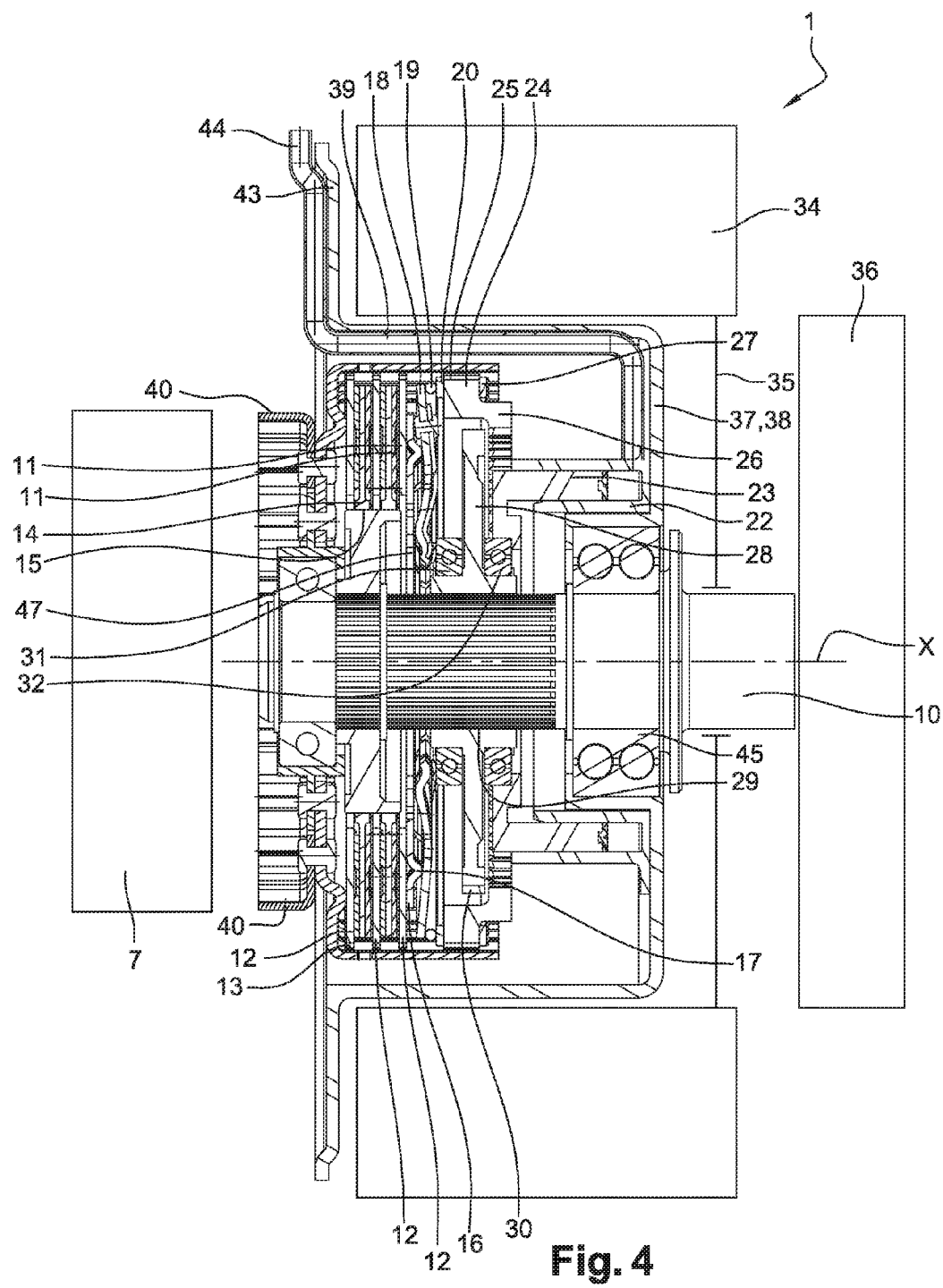
Figure 5:
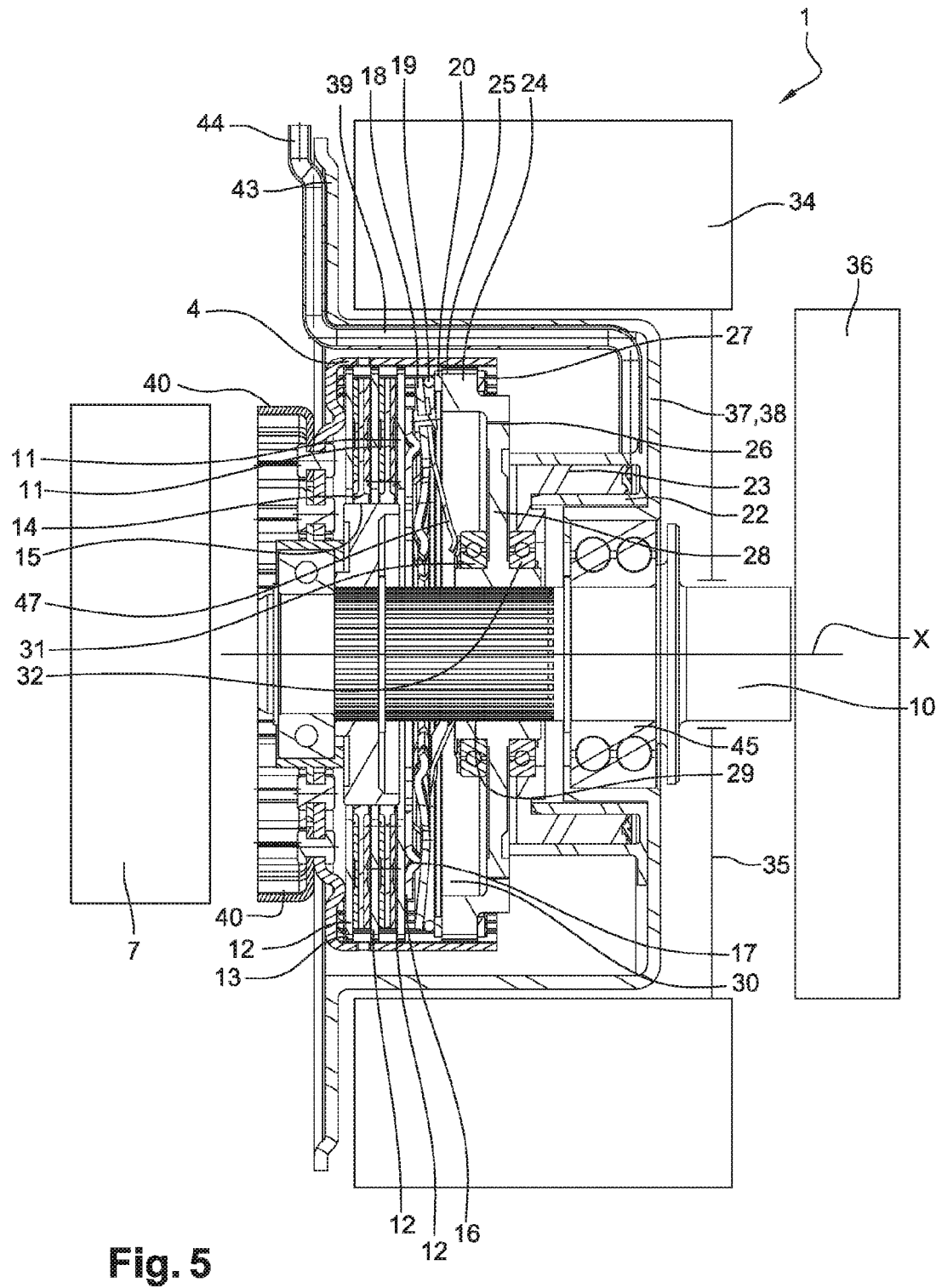

During operation, the transmission member can be displaced between three axial positions depicted respectively in FIGS. 3, 4, and 5.

As illustrated in FIG. 3, when the movable control member 23 and the movable transmission member 28 are displaced rearward, i.e. to the left in the Figures, the bearing 31 actuates the diaphragm 18 so as to displace for flex) the diaphragm 18 into its engaged position in which it comes axially closer to the plates 12 of the radial portion 3 of the cover 2. The friction discs 11 are thereby clamped between the plates 12, and the cover 2 is non-rotatably coupled to the input shaft 10 of the gearbox 36 by means of the plates 12, the friction discs 11, and the central hub 8.

In other words, in this position rotor 34 is rotationally coupled to the crankshaft of internal combustion engine 7.

Note that in this position, transmission member 28 is decoupled from connecting member 24.

An operating mode of this kind can be used in particular when it is desirable to restart internal combustion engine 7 with the aid of the electric machine, which then operates in motor mode ("stop and go" function). Stoppage of the internal combustion engine can be effected in particular during a short-duration stoppage of the vehicle, for example at a red light or in traffic jams. Since the torque needed in order to restart internal combustion engine 7 is low, the discs can be axially compact and the friction surfaces can be reduced.

In this case the torque generated by rotor 34 of the electric machine is transmitted to input shaft 10 of gearbox 36 by means of support 35, then to the crankshaft by means of cover 2 and the aforementioned clutch means. The torque transmitted to the crankshaft can then be effectively controlled in order to prevent any degradation of combustion engine 7 and of torque transmission device 1.

As illustrated in FIG. 4, when movable control member 23 and movable transmission member 28 are displaced forward, i.e. to the right in the Figures, transmission member 28 meshes both with connecting member 24 and with input shaft 10 of the gearbox.

The crankshaft of internal combustion engine 7 is then rotationally coupled to input shaft 10 of gearbox 36 by means of cover 2, connecting member 24, and transmission member 28.

Torque transfer is thus implemented directly between the crankshaft and input shaft 10 of gearbox 36, i.e. without using any clutch means. Geared torque transfer allows a substantial torque to be transferred, in particular much greater than the torque generated by clamping of the friction discs.

An operating mode of this kind can be used in particular to drive input shaft 10 of gearbox 36 using internal combustion engine 7 when the latter has been started. In such a case the electric machine can function in generator mode or alternator mode, in order to recharge a battery of the vehicle and/or to power energy-consuming components or accessories when internal combustion engine 7 is running. The electric machine can furthermore be configured to recover energy upon braking of the vehicle.

In this operating mode as well, the electric machine is capable of furnishing additional power, making it possible to prevent internal combustion engine 7 from stalling ("boost" function).

Lastly, as illustrated in FIG. 5, when the movable control member 23 and the movable transmission member 28 are displaced into an axially middle position situated between the rear and front axial positions of FIGS. 3 and 4, the transmission member 28 is non-rotatably coupled only to the input shaft 10 of the gearbox 36; in particular, the control member 28 and the bearing 31 are not pushing the diaphragm 18 into its engaged position. In this position, the elasticity of the diaphragm 18 therefore returns it to its inactive position, i.e. its disengaged position.

By exerting a forward axial force on actuation member 28 when diaphragm 18 is in an engaged position, web 47 tends to bring actuation member 28 back into the position that it assumes in the third operating mode.

In other words, in this middle position the crankshaft and cover 2 are decoupled from input shaft 10 of gearbox 36 and from rotor 34 of the electric machine.

Input shaft 10 of gearbox 36 and the rotor of the electric machine remain rotationally coupled. In this type of operating mode the electric machine can then be capable of driving input shaft 10 of gearbox 36, and thus the vehicle, at least for a short distance.

Note that in order to shift from its rear position (FIG. 3) to its front position (FIG. 4), transmission member 28 must necessarily pass through its axially middle position (FIG. 5), so that there is no operating point at which the two operating modes described above with reference to FIGS. 4 and 5 can be activated simultaneously; this improves the operation of torque transmission device 1.

The invention thus proposes a torque transmission device 1 that is reliable, with little axial and radial bulk, and with little complexity and little cost, as compared with the existing art.

The invention claimed is:

1. A torque transmission device (1), comprising:
a torque input device (2, 24) intended to be non-rotatably coupled to a crankshaft of an internal combustion engine (7); and
a torque output device (8) intended to be non-rotatably coupled to an input shaft (10) of a gearbox (36) and to a rotor (34) of an electric machine; and
a controller;
the torque input device (2, 24) configured to pivot with respect to the torque output device (8) around an axis (X);
the controller configured to selectively:
non-rotatably couple the torque input device (2, 24) and the torque output device (8) via a first torque transfer path having a clutch (11, 12, 18) in a first operating mode; or
non-rotatably couple the torque input device (2, 24) and the torque output device (8) via a second torque transfer path having no clutch in a second operating mode.

2. The torque transmission device (1) according to claim 1, wherein the controller is configured to, in a third operating mode, rotatably decouple the torque input device (2, 24) and the torque output device (8).

3. The torque transmission device (1) according to claim 1, wherein the controller has a release bearing (21) comprising an actuation member (23) movable between:
a first axial position corresponding to the first operating mode, and
a second axial position corresponding to the second operating mode.

4. The torque transmission device (1) according to claim 3, wherein the controller also has a transmission member (28) comprising a first coupling zone (29) intended to be non-rotatably coupled to the input shaft (10) of the gearbox (36) and a second coupling zone (30), wherein the transmission member (28) is movable axially with the movable actuation member (23) of the release bearing (21), and wherein the second coupling zone (30) is coupled to the torque input device (2, 24) in the second axial position.

5. The torque transmission device (1) according to claim 4, wherein the first coupling zone (29) is situated radially inside the transmission member (28), and wherein the second coupling zone (30) is situated radially outside the transmission member (28).

6. The torque transmission device (1) according to claim 3, wherein the clutch has at least two plates (12) and at least one friction disc (11) situated axially between the at least two plates (12), wherein the at least one friction disc (11) or the at least two plates (12) respectively are non-rotatably coupled to a hub (8) of the torque output device, wherein the at least two plates (12) or the at least one friction disc (11) respectively are coupled to the torque input device (2, 24), and wherein the at least two plates (12) being are brought axially closer to one another in order to clamp the at least one friction disc (11) in the first operating mode.

7. The torque transmission device (1) according to claim 6, wherein the clutch has a diaphragm (18) configured to flex between an engaged position in which the diaphragm (18) clamps the at least one friction disc (11) between the at least two plates (12), and a disengaged position the diaphragm (18) releases the at least one friction disc (11), wherein the actuation member (23) is configured to come into abutment against the diaphragm (18) so as to displace the diaphragm (18) into the engaged position in the first axial position of the actuation member (23).

8. The torque transmission device (1) according to claim 7, wherein the diaphragm (18) is annular, wherein the actuation member (23) comes into abutment against a radially inner periphery of the diaphragm (18) in the first axial position, wherein the diaphragm (18) is disposed adjacent to a first radially outer abutment zone (19), and wherein the diaphragm (18) comes into abutment against one of the at least two plates (12), directly or indirectly, in a second abutment zone (17) situated radially inside the first radially outer abutment zone (19).

9. The torque transmission device (1) according to claim 4, wherein the torque input device includes a cover (2) that receives, at least in part, the clutch (11, 12, 18), the actuation member (23), the transmission member (28) and the hub (8).

10. The torque transmission device (1) according to claim 4, wherein the torque input device includes a cover (2) and a connecting member (24) non-rotatably coupled to the cover (2), wherein the second coupling zone (30) of the transmission member (28) is in mesh with the connecting member (24) in the second axial position of the actuation member (23) and of the transmission member (28).

11. A hybrid drive system, comprising:
an internal combustion engine (7) having a crankshaft rotatable about an axis (X);
an electric machine having a stator and a rotor (34) rotatable with respect to the stator around the axis (X);
a gearbox (36) having an input shaft (10);
a torque transmission device (1) according to claim 1;
the rotor (34), the input shaft (10) of the gearbox (36) and the torque output device (8) being non-rotatably coupled;
the torque input device (2, 24) and the crankshaft being non-rotatably coupled.

12. The torque transmission device (1) according to claim 2, wherein the controller has a release bearing (21) comprising an actuation member (23) movable between:
a first axial position corresponding to the first operating mode,
a second axial position corresponding to the second operating mode, and
a third axial position corresponding to the third operating mode.

13. The torque transmission device (1) according to claim 2, wherein the clutch has at least two plates (12) and at least one friction disc (11) situated axially between the at least two plates (12), the at least one friction disc (11) or the at least two plates (12) respectively are non-rotatably coupled to a hub (8) of the torque output device, wherein the at least two plates (12) or the at least one friction disc (11) respectively are coupled to the torque input device (2, 24), and wherein the at least two plates (12) are brought axially closer to one another in order to clamp the at least one friction disc (11) in the first operating mode.

14. The torque transmission device (1) according to claim 4, wherein the clutch has at least two plates (12) and at least one friction disc (11) situated axially between the at least two plates (12), the at least one friction disc (11) or the at least two plates (12) respectively are non-rotatably coupled to a hub (8) of the torque output device, wherein the at least two plates (12) or the at least one friction disc (11) respectively are coupled to the torque input device (2, 24), and wherein the at least two plates (12) are brought axially closer to one another in order to clamp the at least one friction disc (11) in the first operating mode.

15. The torque transmission device (1) according to claim 5, wherein the clutch has at least two plates (12) and at least one friction disc (11) situated axially between the at least two plates (12), the at least one friction disc (11) or the at least two plates (12) respectively are non-rotatably coupled to a hub (8) of the torque output device, wherein the at least two plates (12) or the at least one friction disc (11) respectively are coupled to the torque input device (2, 24), and wherein the at least two plates (12) are brought axially closer to one another in order to clamp the at least one friction disc (11) in the first operating mode.

16. The torque transmission device (1) according to claim 12, wherein the third axial position is situated axially between the first and second axial positions.

17. The torque transmission device (1) according to claim 16, wherein the controller also has a transmission member (28) comprising a first coupling zone (29) intended to be non-rotatably coupled to the input shaft (10) of the gearbox (36) and a second coupling zone (30), wherein the transmission member (28) is movable axially with the movable actuation member (23) of the release bearing (21), and wherein the second coupling zone (30) is coupled to the torque input device (2, 24) in the second axial position.

18. The torque transmission device (1) according to claim 16, wherein the clutch has at least two plates (12) and at least one friction disc (11) situated axially between the at least two plates (12), the at least one friction disc (11) or the at least two plates (12) respectively are non-rotatably coupled to a hub (8) of the torque output device, wherein the at least two plates (12) or the at least one friction disc (11) respectively are coupled to the torque input device (2, 24), and wherein the at least two plates (12) are brought axially closer to one another in order to clamp the at least one friction disc (11) in the first operating mode.

19. The torque transmission device (1) according to claim 12, wherein the controller also has a transmission member (28) comprising a first coupling zone (29) intended to be non-rotatably coupled to the input shaft (10) of the gearbox (36) and a second coupling zone (30), wherein the transmission member (28) is movable axially with the movable actuation member (23) of the release bearing (21), and wherein the second coupling zone (30) is coupled to the torque input device (2, 24) in the second axial position.

* * * * *